(12) United States Patent
Kobayashi

(10) Patent No.: US 8,180,566 B2
(45) Date of Patent: May 15, 2012

(54) APPARATUS AND PROGRAM FOR FINDING VEHICLE POSITION

(75) Inventor: Tomokazu Kobayashi, Kariya (JP)

(73) Assignee: DENSO CORPORATION, Kariya ( * ) Notice: Subject to any disclaimer, the term of this patent is extended or adjusted under 35 U.S.C. 154(b) by 422 days.

(21) Appl. No.: 12/453,567

(22) Filed: May 14, 2009

(65) Prior Publication Data

US 2009/0287410 A1 Nov. 19, 2009

(30) Foreign Application Priority Data

May 15, 2008 (JP) .................... 2008-128294

(51) Int. Cl.
*G01C 21/34* (2006.01)
(52) U.S. Cl. .................. 701/411; 701/445; 701/446
(58) Field of Classification Search .................. 701/208, 701/209, 210, 214, 216, 409, 410, 411, 445–447
See application file for complete search history.

(56) References Cited

U.S. PATENT DOCUMENTS

| | | | | |
|---|---|---|---|---|
| 5,060,162 A * | 10/1991 | Ueyama et al. | ........ | 701/209 |
| 5,523,765 A * | 6/1996 | Ichikawa | ........ | 342/451 |
| 6,581,005 B2 * | 6/2003 | Watanabe et al. | ........ | 701/210 |
| 7,756,634 B2 * | 7/2010 | Mori | ........ | 701/208 |
| 2004/0204827 A1 * | 10/2004 | Usui | ........ | 701/201 |
| 2008/0004804 A1 | 1/2008 | Fujita et al. | | |
| 2008/0021638 A1 * | 1/2008 | Kobayashi | ........ | 701/208 |
| 2010/0121518 A1 * | 5/2010 | Tiernan et al. | ........ | 701/26 |
| 2011/0093195 A1 * | 4/2011 | Chiba et al. | ........ | 701/208 |

FOREIGN PATENT DOCUMENTS

| | | |
|---|---|---|
| JP | A-2-130415 | 5/1990 |
| JP | A-8-068656 | 3/1996 |
| JP | A-10-300492 | 11/1998 |
| JP | A-11-232583 | 8/1999 |
| JP | A-2003-067883 | 3/2003 |
| JP | A-2003-121180 | 4/2003 |
| JP | A-2003-288665 | 10/2003 |
| JP | A-2004-226341 | 8/2004 |
| JP | A-2005-207821 | 8/2005 |
| JP | A-2008-170267 | 7/2008 |

OTHER PUBLICATIONS

English Translation (Machine) of JP 2005-207821; Pub. Date: Apr. 8, 2005; INv: Ozawa, Yuji.*
Notification of Reason(s) for Refusal issued on Apr. 6, 2010 by the Japan Patent Office in corresponding Japanese Application No. 2008-128294 (English translation enclosed).
Extended European Search Report dated Sep. 21, 2011 issued in corresponding EPC application No. 09006491.6.

* cited by examiner

*Primary Examiner* — Joseph C Rodriguez
(74) *Attorney, Agent, or Firm* — Posz Law Group, PLC

(57) ABSTRACT

A navigation apparatus calculates a current position candidate of a vehicle based on absolute position information, and calculates a travelable area based on road width data and the like, and further calculates a center locus of the travelable area and an estimated position of the vehicle. The estimated position of the vehicle is then evaluated based on a distance between the estimated position and the center locus to yield a position candidate evaluation for displaying a current position mark on a displayed map.

15 Claims, 10 Drawing Sheets

FIG. 3A
FIG. 3B
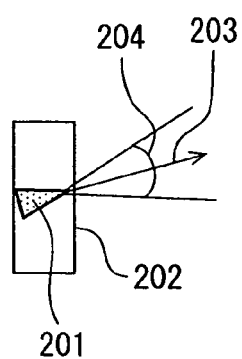
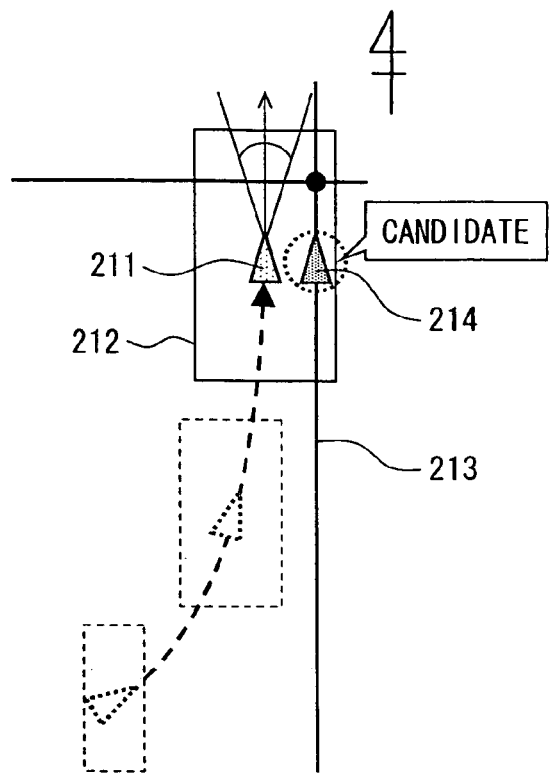

| | CANDIDATE LINK | TEMPLATE | SIMILARITY | RESULT |
|---|---|---|---|---|
| a | | | | HIGH |
| b | | | | LOW |

APPARATUS AND PROGRAM FOR FINDING VEHICLE POSITION

CROSS REFERENCE TO RELATED APPLICATION

The present application is based on and claims the benefit of priority of Japanese Patent Application No. 2008-128294, filed on May 15, 2008, the disclosure of which is incorporated herein by reference.

FIELD OF THE INVENTION

The present disclosure generally relates to a navigation apparatus for use in a vehicle.

BACKGROUND INFORMATION

Conventionally, the map matching method used in the navigation apparatus typically finds the vehicle position based on the travel locus of the vehicle calculated by performing the autonomous navigation and by associating the travel locus to the map data. For example, the technique disclosed in a Japanese patent document JP-A-H02-130415 approximates the travel locus of the vehicle by using a fixed length element, and matches the approximation with the map data by selecting, from among the road candidates, one that minimizes the difference of two vectors respectively representing the approximated element and the road candidate. In this case, the road candidates in the map data are also approximated by the fixed length elements. However, road links used in the map matching method represents a center line of the actual road, that is, the center of the road width even when the actual road has bi-directional traffic lanes. Therefore, the following problems are encountered.

FIG. 11A shows an example that road links (link data) of both of a wide road and a narrow road substantially represent the center of the road width of both roads. That is, from the intersection O, link data extends to points C, D and E for representing the wide road, and extends to points A and B for representing the narrow road. The position of the link data is shown in FIG. 11B.

Therefore, when the travel of the vehicle comes from the point A into the intersection O to exit toward the point E, the series of road links for representing the travel can be denoted as AF to FG to GE. However, a portion of the series of road links diverts from the actual road shape and the actual travel locus, the correlation between the road links and the travel locus is deteriorated, thereby leading to a false positioning by the navigation apparatus, which either concludes that the vehicle is not traveling on the road, or that the travel of the vehicle is associated with other road links such as AF to FC.

Further, as shown in FIG. 11C, when a large parking space having a depth exists on one side of the road, a link BD is defined at the center of the entrance of the parking space as shown in FIG. 11D.

Therefore, the road links are traced AB to BD to DE when the vehicle enters the parking space. However, according to the map matching method described above, the road links AB to BC falsely represent the travel of the vehicle due to the smaller vector difference.

The above-described problems are caused by approximating the actual road having an area and a width, that is, a two-dimensional surface by using the one-dimensional elements, i.e., road links. This kind of problem is encountered in various situations, not necessarily limited to the above-described one.

To solve the above-described problem, the road width template is used to tailor the travel locus of the vehicle to be within the range of the template. That is, the travel locus and/or the travel direction of the vehicle is adjusted before performing the map matching. A Japanese patent document JP-A-H10-300492 discloses that the two-dimensional polygon template is used to determine whether the points in the travel locus exist within the road width as shown in FIG. 12A.

However, for the determination of the inclusion of the points in the two-dimensional template, memory areas respectively storing point coordinates of each of the points are required. Further, each of the templates requires different memory areas. Therefore, when the inclusion of one point in the template is performed, the parity number of the lines drawn to the subject point from outside of the template has to be calculated. That is, whether the number of intersection points with the template on the lines drawn to the subject point in total is odd/even has to be determined (see FIG. 12B). The intersection calculation then has to be repeated for the number of times derived by the multiplication of the number of points on the travel locus by the number of templates. This leads to the increased memory resources and thus leads to the cost increase of the navigation apparatus. Further, the increase of the calculation load deteriorates the real-timeness of the navigation, and affects other processing performed in the same CPU.

SUMMARY OF THE INVENTION

In view of the above and other problems, the present disclosure provides an apparatus for finding the current vehicle position on the road links in an accurate manner while reducing the required calculation load of position finding.

In an aspect of the present disclosure, the position finding apparatus includes: a position information acquisition unit for acquiring absolute position information indicative of an absolute position of a subject vehicle; a road data acquisition unit for acquiring information on road links and road width; a locus finding unit for finding a center locus of travelable area in each of the road links that is indicative of a center of the travelable area based on calculation of the travelable area for the subject vehicle by utilizing the information on road links and road width respectively derived from the road data acquisition unit; a travel position estimation unit for estimating a travel position of the subject vehicle based on the absolute position derived from the absolute position acquisition unit; an evaluation unit for performing evaluation of each of the road links that corresponds to the center locus based on a distance between the estimated travel position derived from the travel position estimation unit and the center locus derived from the locus finding unit; and a current position finding unit for finding a current vehicle position of the subject vehicle on a road link after selecting the road link based on the evaluation of each of the road links.

Based on the evaluation of the road links according to the distance between the estimated position and the center locus of the travelable area, the apparatus finds the position of the vehicle. Therefore, the position of the vehicle can be more accurately found and determined. This is because that the center locus of the travelable area is closer to the actual trace of the vehicle travel on the road relative to the road links. Further, the memory area for storing the coordinates of the two-dimensional polygon template is not required, thereby leading to the reduced cost of hardware resources and leading to the reduced number of calculation and processing load in the position finding.

The above functionality of the apparatus may be provided as the program product stored in a computer-readable medium.

BRIEF DESCRIPTION OF THE DRAWINGS

Objects, features, and advantages of the present disclosure will become more apparent from the following detailed description made with reference to the accompanying drawings, in which:

FIGS. 3A and 3B are illustrations of errors in current position detection processing;

DETAILED DESCRIPTION

An embodiment of the present disclosure is described with reference to the drawings. However, the present disclosure is not at all bound or limited by the following description of the embodiment, in terms of the scope of the presented idea.

In addition, the following description assumes a left-side traffic where vehicles generally travel on a left half of the roads. The right-side traffic implemented countries can, thus, adopt the idea of the present disclosure by replacing the left side with the right side of the road in reading and understanding the description.

(Structure of Navigation Apparatus)

Figure 1:
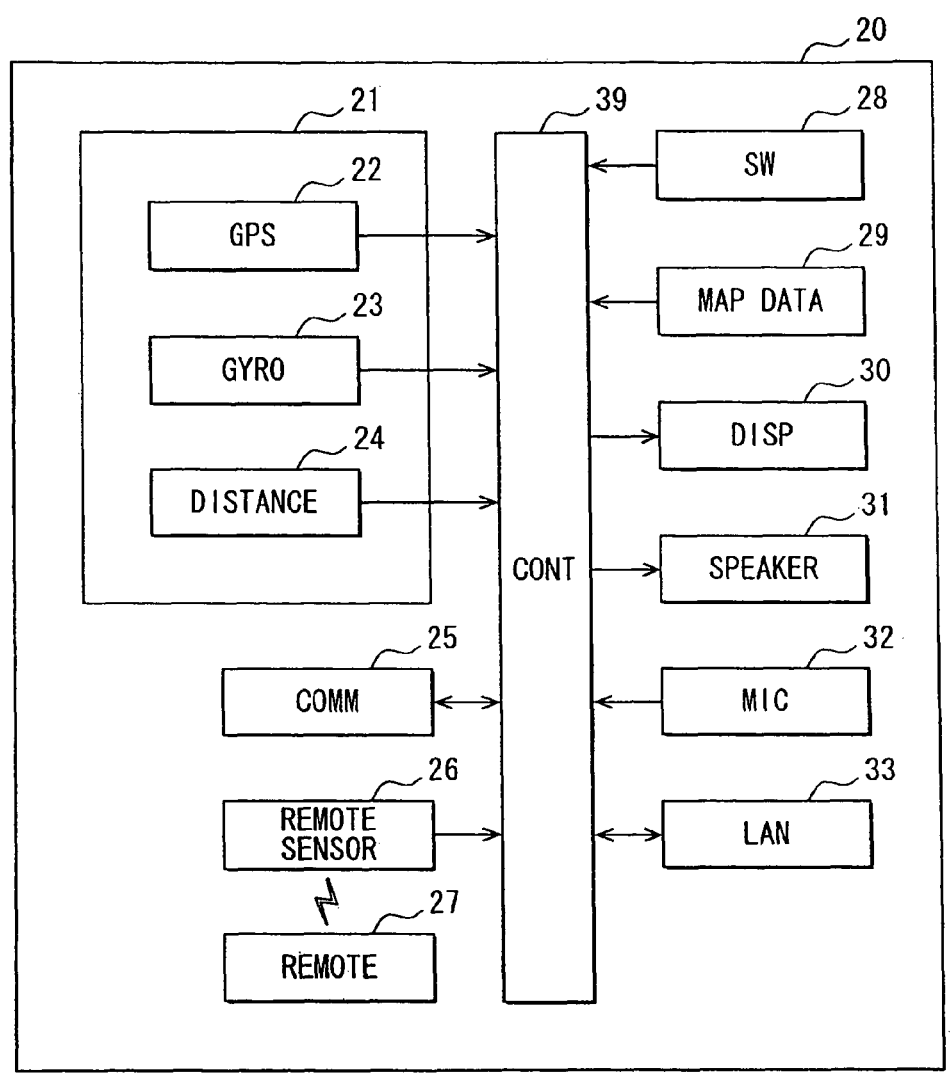
FIG. 1 is a block diagram showing a structure of a navigation apparatus.

FIG. 1 is a block diagram showing outline constitution of a navigation apparatus 20 which has a function of a position calculation apparatus of the present disclosure incorporated therein.

The navigation apparatus 20 is disposed on a vehicle, and includes a position detection unit 21 for detecting a current position of the vehicle, a communication unit 25 for performing wireless communication with an outside of the apparatus, a group of operation switches 28 for an input of various instructions, a remote controller sensor 26 and a remote controller 27 that serve as an equivalent of the operation switches 28 through wireless communication, a map data input unit 29 for an input of data from memory medium such as a CD/DVD ROM, a display unit 30 for displaying map data and the like, a speaker 31 for outputting guidance voice or the like, a microphone 32 for an input of user's voice as an electric signal, and a LAN interface 33 for communication with a vehicle LAN. The above components are respectively connected to and controlled by a control unit 39 for various processing and input/output from/to the apparatus.

The position detection unit 21 detects the current position of the vehicle by using a GPS antenna (not shown), a GPS unit 22, a gyroscope 23, and a distance sensor 24. That is, through the GPS antenna, the GPS unit 22 receives GPS signals from satellites of the global positioning system, and the received signals are output to the control unit 29 together with the signals from rotation signals from the gyro 23 for representing a rotational vehicle motion and distance signals from the distance sensor 24 for representing the travel distance of the vehicle. The control unit 39 utilizes those signals from various sensors for calculating the current position of the vehicle, as well as a travel direction and a travel speed of the vehicle. In this case, the current position of the vehicle may be calculated based on a point positioning method, a relative positioning method or combination of various available methods.

The group of operation switches 28 consists of the mechanical key switches which are disposed around the display unit 30 and a touch panel integrated with the display surface of the display unit 30, as well as other components. The touch panel may use any one or more of the available touch sensing methods such as a pressure sensing method, electromagnetic method, static-electricity method and the like.

The remote controller 27 consists of multiple buttons, and, whenever one of those buttons is pressed, a corresponding signal is transmitted wirelessly to the remote controller sensor 26 through the short distance wireless communication such as infrared rays communication.

The remote sensor 26 receives a signal from the remote controller 27, and a received signal is output to the control unit 39.

The communication unit 25 acquires information regarding traffic accident and/or traffic jam through a light beacon or an electric wave beacon installed on the roadside from a traffic information center, or acquires guide information from a server through a packet communications network.

The map data input unit 29 is a device to input various data from a map data storage medium (for example, a hard disk drive, a DVD-ROM or the like), which is not illustrated. From the map data storage medium, map data such as node data, link data, road width data, road classification data, traffic regulation data, cost data, road name data, intersection data or the like, together with POI (i.e., Point Of Interest) data such as POI name data, genre data, position data as well as sound data for guidance voice, sound recognition data are retrieved. In addition, instead of inputting these data from the map data storage medium, these data may be acquired through a communication network.

The display unit 30 may use a liquid crystal display or an organic electroluminescence display for displaying map and information such as a vehicle position mark for representing the current vehicle position, a navigation route toward the destination of the travel, facility and place names as well as other marks indicative of various landmarks and the like on top of the map that are acquired by the input unit 29. The information of the facility may also be displayed.

The microphone 32 outputs, to the control region 39, an electrical signal (a voice signal) based on an input sound.

The user can operate the navigation apparatus 20 by inputting various sounds into the microphone 32.

The LAN interface 33 provides an interface, that is, provides a communication with various ECUs (e.g., an engine ECU, an Automatic Transmission-ECU, a brake ECU etc.)

and communication with various sensors (e.g., a blinker sensor, a door opening and shutting sensor etc.) respectively connected to the vehicle LAN.

The control unit 39 is a microcomputer that has a CPU, a ROM, a RAM, a flash memory, an input/output unit and a bus line for interconnection of these components. The control unit 39 performs various processing based on a program stored in the ROM, flash memory or the like. The processing includes, current position display processing for displaying a current vehicle position on a map together with a travel direction based on various detection signals from the sensors and data from the map data memory medium, route calculation processing for calculating an optimum navigation route toward the destination from the current position based on the map data and user inputs from the switches and other devices, route guidance processing for providing route guidance by using visual and vocal output from the display unit 30 and the speaker 31.

(Operation of Navigation Apparatus)

Figure 2:
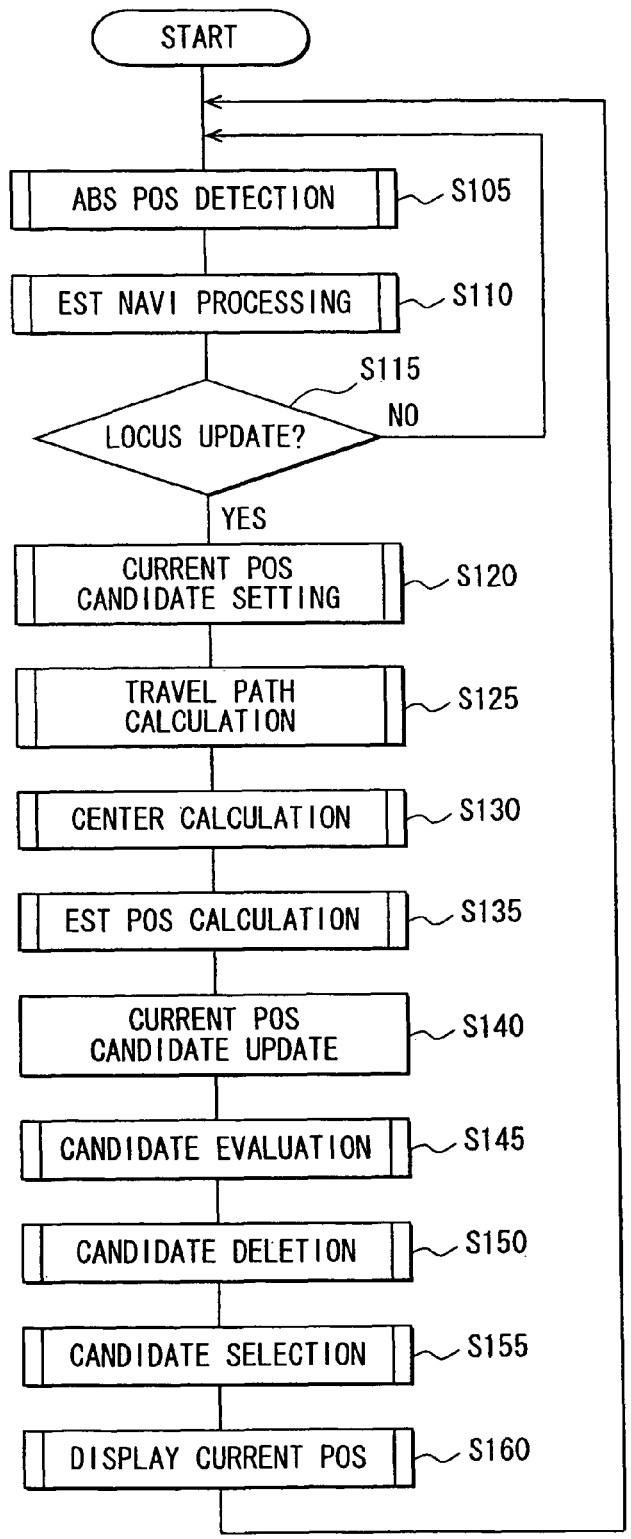
FIG. 2 is a flow chart of current position display processing by the navigation apparatus.

The operation of the navigation apparatus 20 is described in the following, with the focus of current position display, which is devised as a novel and inventive technique in the art by the inventor(s) of the present disclosure. FIG. 2, a flowchart of the operation, is used to describe how the navigation apparatus 20 executes the current position display processing after an electric power supply is started for the navigation apparatus 20.

(1) Absolute Position Detection Processing (S105)

When the control unit 39 starts the absolute position detection processing in the first part of the position display processing (S105). In the detection processing, the absolute position of the vehicle as well as the travel speed and travel direction are calculated based on the signals from the GPS unit 22. In the position calculation, errors due to the GPS signal and calculation process such as round off errors or the like are included as shown in FIG. 3A. That is, if a point 201 is assumed to be an absolute position of the vehicle and a direction 203 is assumed to be an absolute direction, the errors may include a positional error range 202 relative to the position 201, and a directional error range 204 respectively defining maximum errors of the position and direction.

(2) Estimated Navigation Processing (S110)

The control unit 39 then carries out the estimated navigation processing (S110). By the estimated navigation processing, a relative travel distance and a relative directional change of the vehicle is calculated based on the calculation in the previous processing time of the same processing by utilizing signals from the gyroscope 23 and the distance sensor 24, and the directional change and the travel distance are combined to yield a travel locus of the vehicle. Then, by appending the newly calculated travel locus to the previous locus, the travel of the vehicle can be entirely calculated. In this case, the travel locus of the vehicle can be, in a "relative" manner, represented. By designating "relative," the travel locus of the vehicle is represented with reference to the travel locus in the past, or, the travel locus already calculated and stored in the navigation apparatus, instead of the reference to an absolute point defined by, for example, position coordinates and directions of north, south, east and west. The "relative" position preferably indicates a position calculated by using an absolute position from S105 and the relative travel distance and the relative directional change in consideration of the error range of respective sensors.

The control unit 39 then determines whether the travel locus calculated by the estimated navigation processing has been updated (S115). If the movement of the vehicle has been detected, the determination is in the affirmative (i.e., YES). If the vehicle movement is periodically updated, the travel locus update is also detected at the predetermined interval of the periodical movement update. The process proceeds to S120 after the affirmative determination in S115, or returns to S105 after the negative determination in S115.

(3) Current Position Candidate Setting Processing (S120)

In S120 which comes after the travel locus update, the control unit 39 carries out the current position candidate setting processing (S120). In the setting processing, the map data is referred to through the map data input unit 29, and a link that is possibly traveled by the vehicle is identified based on the position calculated in S105, with a position candidate placed on the identified link. That is, for example, when the absolute position of the vehicle is represent by a point 211 and the estimated error range is represented by a range 212 as shown in FIG. 3B, the "current" link is identified as a link 213 in view of the current travel direction identified as the absolute north. Then, the closest point on the identified link 213 to the point 211 is identified and set as a current position candidate 214. In this case, multiple position candidates may be identified and set by identifying multiple links.

(4) Travel Path Calculation Processing (S125)

The control unit 39 then calculates a travelable path by performing the travel path calculation processing (S125). In the path calculation processing, series of links that are formulated as the travelable path that can be possibly traveled by the vehicle in consideration of the traffic regulations and other restrictions based on the current position candidate (i.e., the current link) identified in S120. The series of links may be calculated as multiple routes, that is, all possible paths are calculated and identified as the series of links. In this case, the length of the series of links is defined a threshold number. That is, the number of links calculated and identified is equal to or smaller than the threshold number. The threshold number of the links may be replaced with the total distance of the path that is represented by the series of links. The travelable path is preferably calculated in consideration of the travel direction of the vehicle. Further, the travelable path is calculated for each of the multiple current position candidates if the multiple candidates have been calculated in the processing in S120.

Figure 4A:
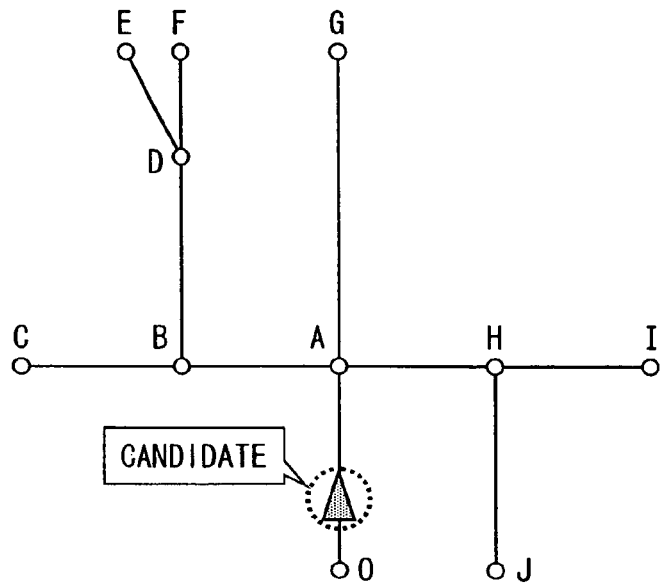
FIGS. 4A and 4B are illustrations of path calculation in travel path calculation processing.
Figure 4B:
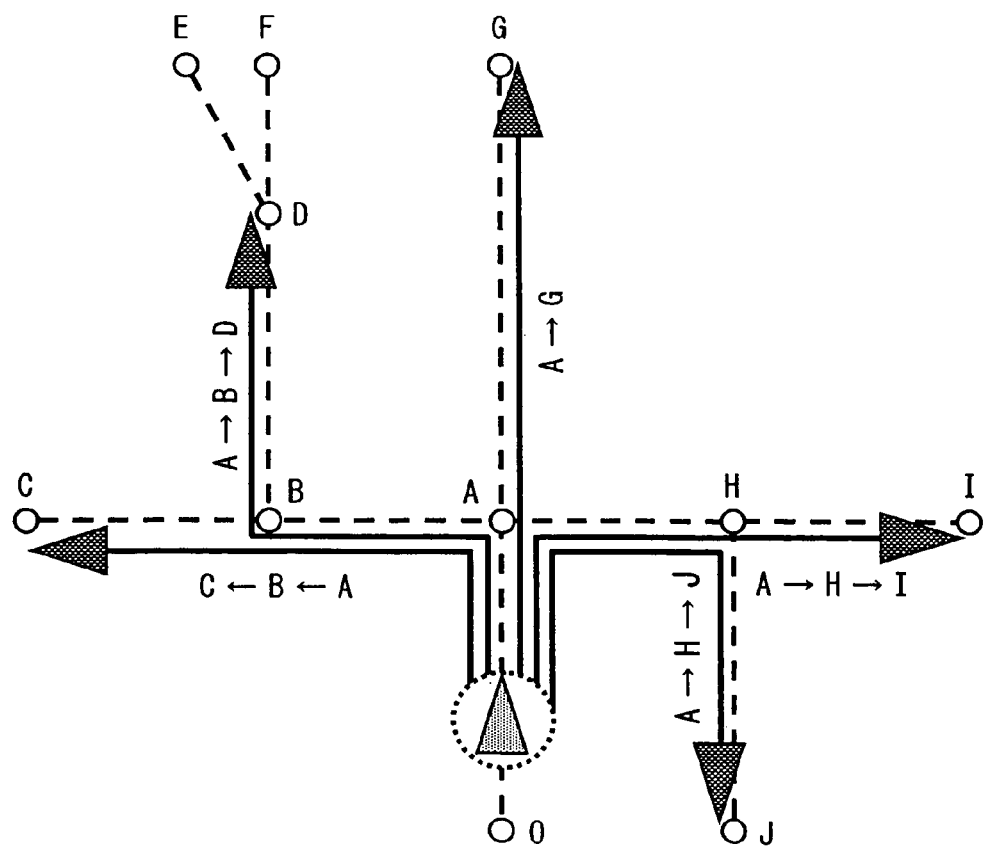

The above processing is further described with reference to illustrations in FIGS. 4A and 4B. That is, for example, when the current position candidate is set on a link between a node A and a node O (i.e., on a link OA), five travelable paths of O to C, O to D, O to G, O to I, and O to J are calculated. More specifically, as shown in FIG. 4B, a link OA—a link AB—a link BC (a node A to a node B to a node C) is calculated as one path; a link OA—a link AB—a link BD (a node A to a node B to a node D) is calculated as another path; a link OA—a link AG (a node A to a node G) is calculated as yet another path; a link OA—a link AH—a link Hi (a node A to a node H to a node 1) is calculated as' still yet another path; and a link OA—a link AH—a link HJ (a node A to a node H to a node J) is calculated as still yet another path. In the above example, the node D has to further links that lead to a node E and a node F. However, the restriction of the path length is applied, and further links are not calculated in this case.

Further, when it is assumed that the straight travel is expected in higher possibility than a left/right turn at an intersection, the straight links may be prioritized in the calculation of the link series. In that case, the travelable path may be re-calculated upon detecting a turn at an intersection. In this manner, the processing efficiency may be improved in terms of calculating highly possibly travelable paths in the link series calculation.

Furthermore, when a guidance route has already been set by the navigation apparatus 20, a step to acquire the information of the guidance route (guidance route information) may be taken prior to calculation of the travelable path, and the guidance route based on the acquired information may be prioritized in the calculation of the link series. This calculation scheme may further improve the processing efficiency due to the similar reason described in the previous paragraph.

(5) Center Locus Calculation Processing (S130)

Figure 5A:
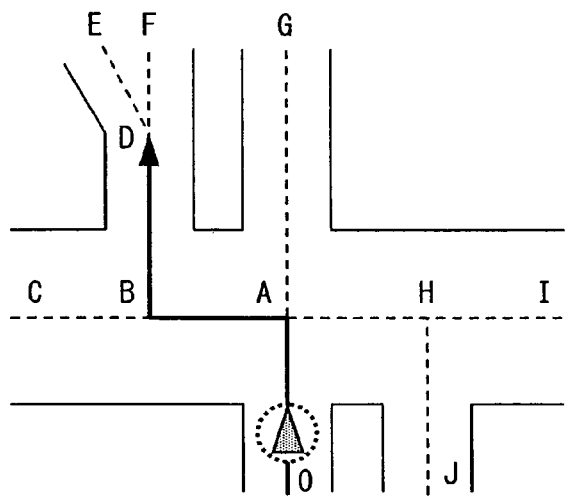
FIGS. 5A to 5D are illustrations of center locus calculation in center locus calculation processing.

The control unit 39 then performs center locus calculation processing (S130). The center locus calculation processing calculates a center locus of a "travelable area," as shown in FIG. 5A together with other illustrations. That is, for each of the travelable paths generated in the preceding process, the road width data (or information on the number of lanes) is extracted from the map data, and the road width is recognized as the travelable area. The travelable area is recognized together with the consideration of the traffic direction and traffic regulations such as one way traffic, bi-directional traffic, right-side traffic, and left-side traffic. If the road is defined as the bi-directional road link, the regulated side of the link is recognized as the travelable area (i.e., travelable side of the road), and, if the road is defined as the one-way road link, the travelable area is recognized as the both side of the link with the link itself centered in the travelable area. After calculation of the travelable area, the center line of the travelable area, and the center line of each link is combined to yield the center locus of the travelable area.

The concrete example of the center locus calculation is shown with reference to FIGS. 5A to 5D. The example shows the calculation of the center locus for the road links from the point O to the point D, that is, from the link OA to the link AB to the link BD.

Figure 5B:
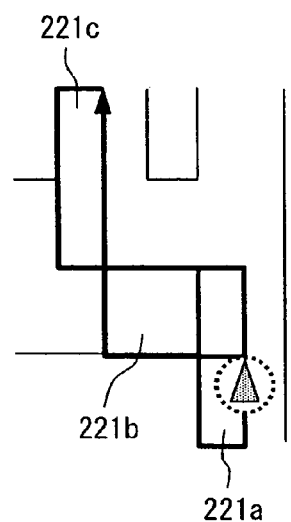

First, for each of the road links, travelable areas 221*a* to 221*c* are identified based on the road width data (or, based on the lane number data and the lane width data) in consideration of the travel direction as shown in FIG. 5B. That is, in other words, the travelable width with reference to the road link is set as each of the travelable areas.

Figure 5C:
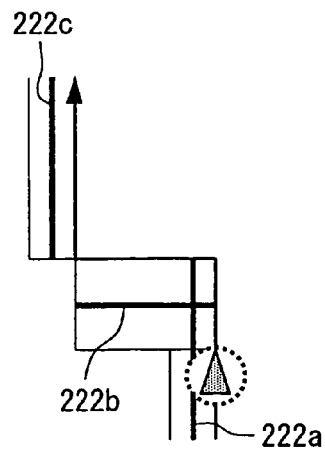

Next, a center line of each of the travelable areas is calculated as shown in FIG. 5C. In the illustration, the center lines are shown as lines 222*a* to 222*c*.

Figure 5D:
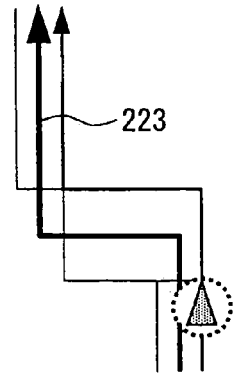

Further, each of the center lines 222*a* to 222*c* is either extended or shortened for a "smooth" inter-connection of the center lines, for the purpose of forming a center locus 223 of the travelable areas as shown in FIG. 5D.

Alternatively, in case that the road width data is un-available or un-developed, the road type data may be used to assume an estimated road width for the calculation.

Figure 6A:
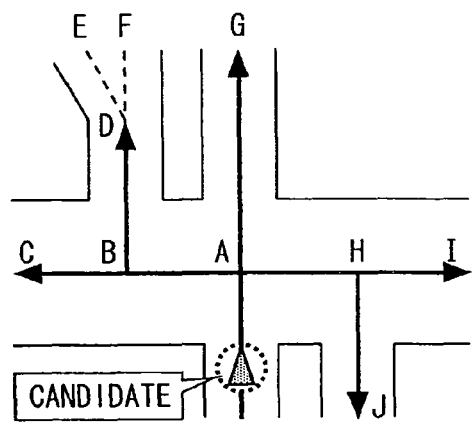
FIGS. 6A and 6B are other illustrations of center locus calculation in the center locus calculation processing.
Figure 6B:
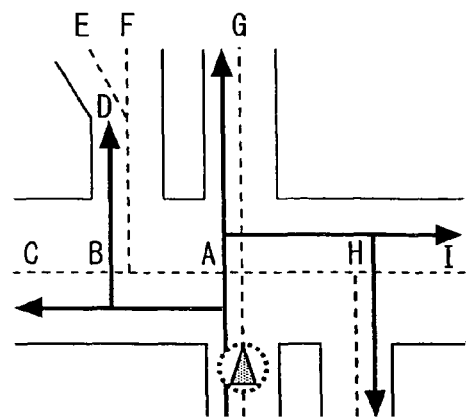

As the result of the center locus calculation processing, the center locus for each of the link series is calculated. That is, as shown in FIGS. 6A and 6B, in correspondence to each of the multiple link series toward the node A to node J, the multiple center loci are defined.

(6) Estimated Position Calculation Processing (S135)

Figure 7A:
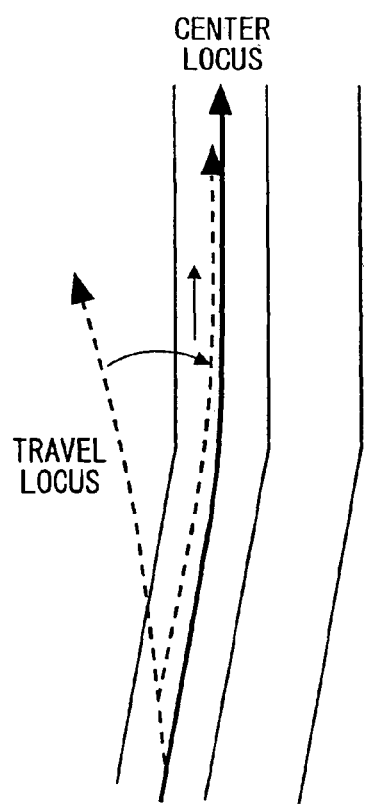
FIGS. 7A and 7B are illustrations of a reference point used in estimated position calculation processing.
Figure 7B:
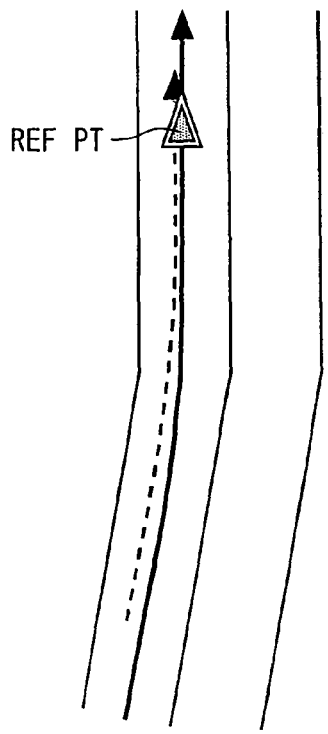

The control unit 39 then performs the estimated position calculation processing (S135). In the estimated position calculation, a pattern matching is performed, relative to the center locus of each of the travelable area, for the travel locus in the preceding travel section, for the distance of 200 meters, for example. The "travel locus" is the trace line of the vehicle travel already calculated in S110. The pattern matching is thus to minimize the directional/positional difference of the relative locus to the center locus by performing rotation and/or parallel movement of the relative locus. The amount of the directional/positional movement is restricted within the range of the error that is supposed to be generated from the relative locus accuracy, pattern matching accuracy, or map data accuracy. Then, a reference point of the pattern matching in the subsequent processing is generated on the center locus of the travelable area as a point that is determined as "most matching" for the travel locus with reference to the center locus (see FIGS. 7A and 7B).

In addition, for the purpose of processing load reduction, the update of the pattern matching reference point may be performed for every 50 meters of vehicle travel, for example, or may be performed for every right/left turn. That is, the reference point update may be performed for a predetermined travel distance, or for every characteristic point in the travel locus. The update timing may be, naturally, a combination of the above criteria.

Figure 8A:
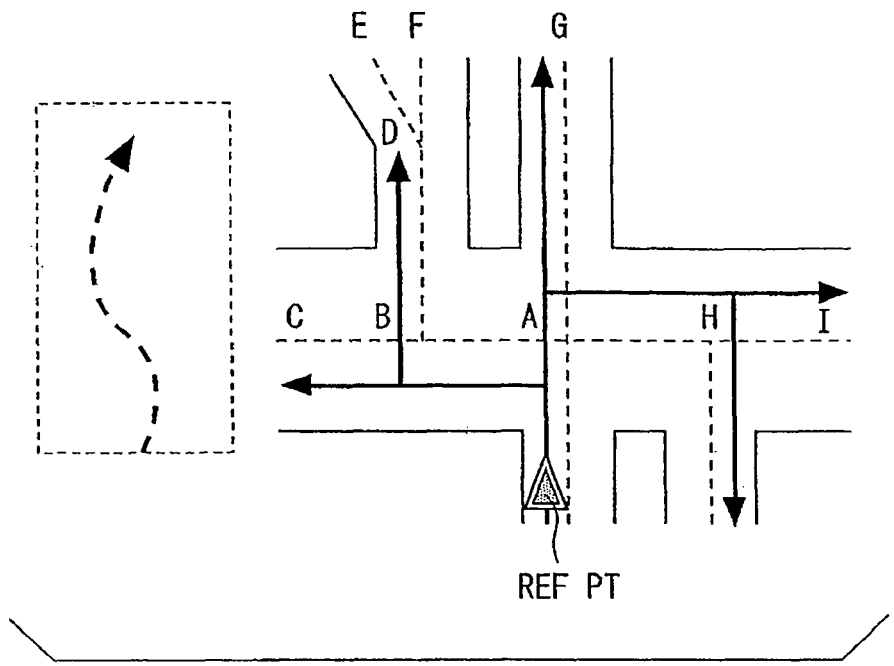
FIGS. 8A and 8B are illustrations of calculation of an estimated vehicle position based on the reference point and a travel locus.
Figure 8B:
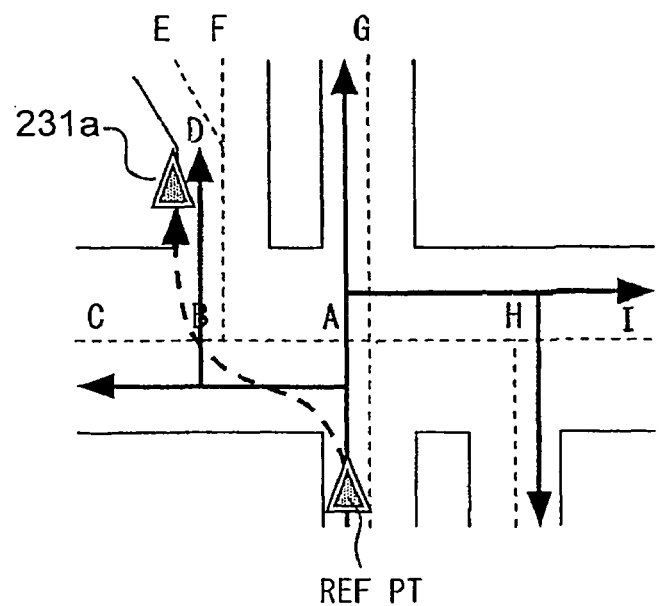

Then, a position estimated from the travel locus based on the calculation by using, as a start point, the latest pattern matching reference point is set as the estimated position of the vehicle. For example, when the relative locus and the center locus with reference to the reference point are available for a certain scope of map data, as shown in FIG. 8A, the relative locus can be matched on the map with the center locus as shown in FIG. 8B. Therefore, the leading end of the relative locus is set as an estimated position 231*a*.

The travel locus accurately represents a traced shape of the vehicle travel for a short section of the vehicle travel, due to the smallness of errors. However, instead of using the travel locus for calculating the estimated position of the vehicle, the absolute position derived from the GPS or the like may be used for the position estimation, as described in the explanation of S105.

(7) Current Position Candidate Update Processing (S140)

The control unit 39 then performs the candidate position update processing (S140). In the candidate position update, the estimated position of the vehicle calculated in S135 is used to determine a road point on the center locus. More practically, a point on the center locus closest to the estimated position is determined as the road point. Then, a position on the road link corresponding to the road point is determined as a new estimated position. In this manner, the current position candidate is sequentially updated time after time.

Figure 9A:
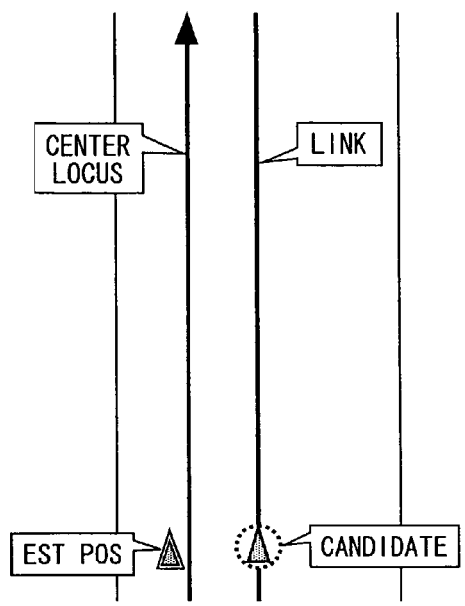
FIGS. 9A and 9B are illustrations of updating of the current position candidate in current position candidate update processing.
Figure 9B:
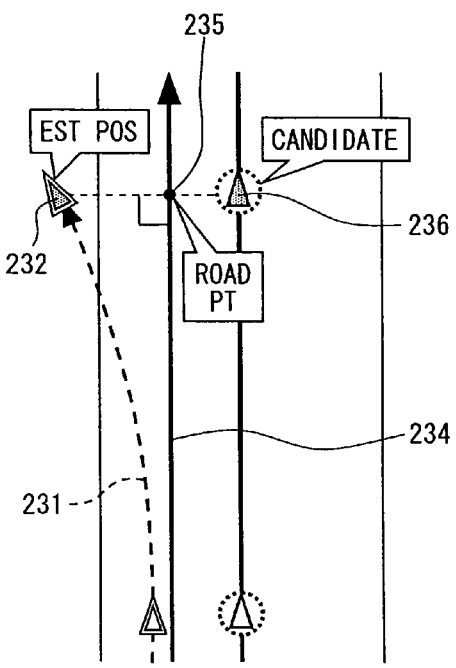

A concrete example is explained with reference to FIGS. 9A and 9B. FIG. 9A is an illustration of a pre-update state of the estimated position, and FIG. 9B is an illustration of a post-update state of the estimated position. That is, based on the pattern matching reference point (not shown in the illustration), an estimated position 232 is calculated from a travel locus 231. Then, the estimated position 232 is used to determine a road point 235 that is closest to the estimated position 232 on a center locus 234. Now, a position on the road link corresponding to the road point 235 is determined as a current position candidate after the update. The above procedure is performed for all of the current position candidates currently being set.

(8) Current Position Candidate Evaluation Processing (S145)

Figure 10:
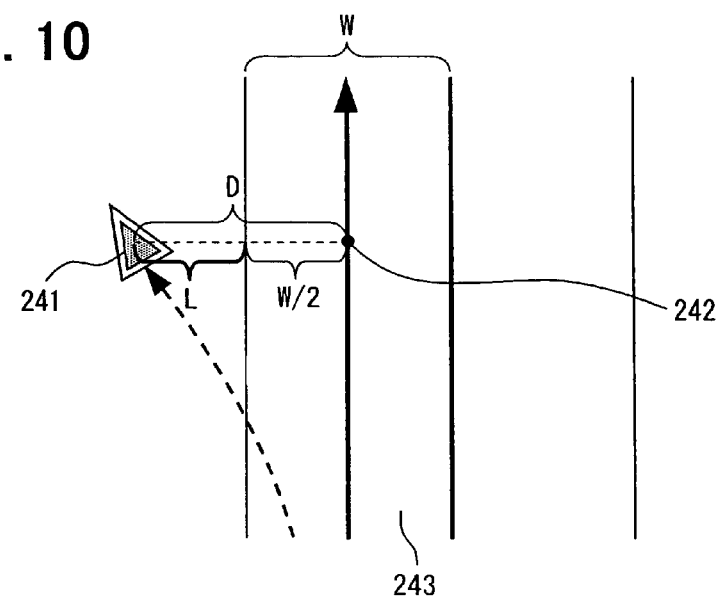
FIG. 10 is an illustration of an evaluation method of current position candidate evaluation processing.
Figure 11A:
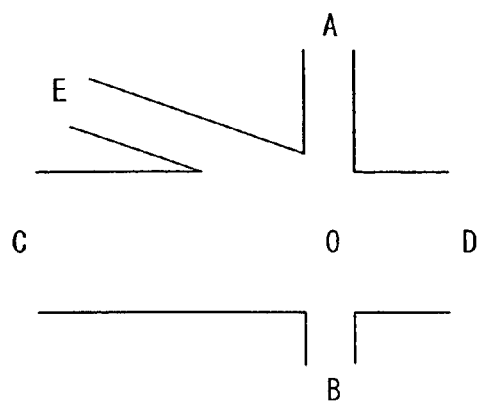
FIGS. 11A to 11D are illustrations of conventional techniques.
Figure 11B:
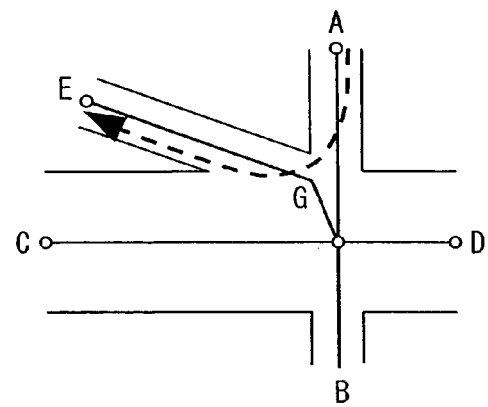
Figure 11C:
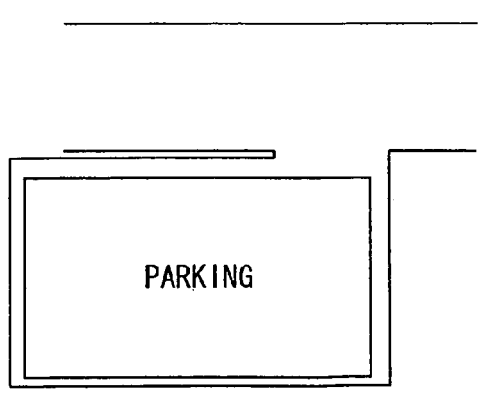
Figure 11D:
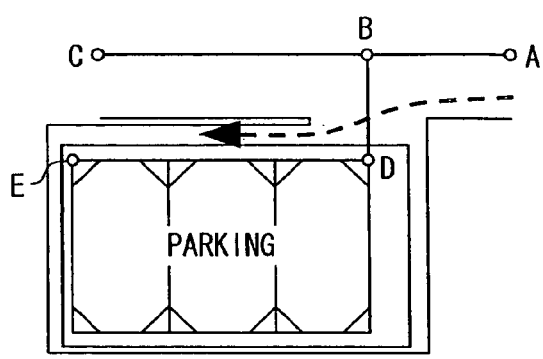
Figures 12A, 12B:
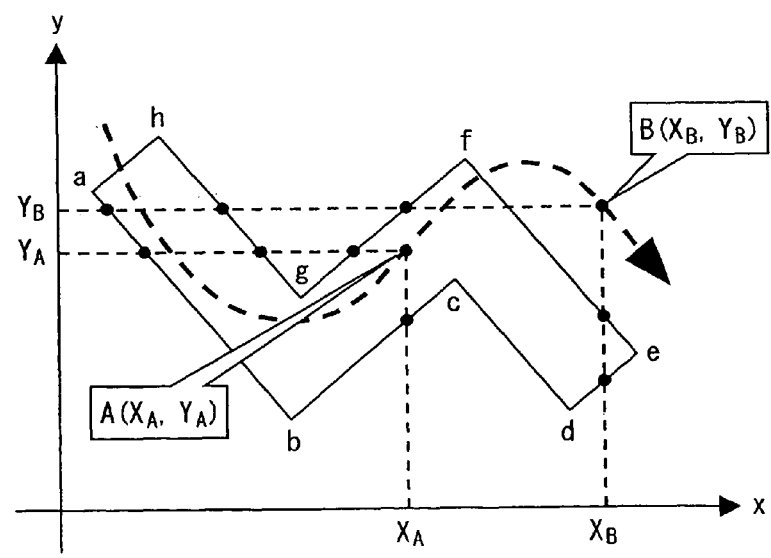
FIGS. 12A and 12B are other illustrations of conventional techniques.

The control unit 39 then performs the current position candidate evaluation processing (S145). In the current position candidate evaluation, based on the distance between the estimated position and the road point together with the road width, a departure distance of the estimated position from the travelable area is calculated, and the calculated departure distance is used to calculate the evaluation value for each of the current position candidates, for the purpose of certainty evaluation of the position candidates. The evaluation value may be calculated as a combinatorial value of the departure distance and (a) directional difference between the estimated travel direction and corresponding center locus, (b) positional/directional difference between the absolute position and the road point, or (c) other road shape related factors relative to the travel locus and/or the absolute position. The evaluation value may also be calculated as the average of the above-described value in a certain section of the road, or a total of (d) accumulated values and (e) latest momentary values weighted by some weighting factor A concrete example is explained with reference to FIG. 10. The illustration shows that:

(a) Based on a distance D between the estimated position 241 and the road point 242, together with a road width W, a departure distance L is calculated as the distance from the travelable area 243 to the estimated position 241, and (b) By using the departure distance L, an evaluation value E (t) is calculated in the following equation.

$$E(t)=E(t-1)\times \text{factor } k + L \times (1 - \text{factor } k)$$

The above equation may be differently formulated according to the considered factors in the evaluation scheme.

(9) Current Position Candidate Deletion Processing (S150)

The control unit 39 then performs the current position candidate deletion processing (S150). In the deletion of the current position candidates, the candidates evaluated to have a lower possibility of correct current position relative to other candidates are deleted, based on the evaluation value calculated in S145. The deleted candidates are not processed in the subsequent processing. The determination of deletion of the candidates may be performed not only based on the evaluation value in S145, but also based on a combination of the evaluation value and other factors such as the positional different between the current position candidate and the absolute position or the like.

(10) Current Position Candidate Selection Processing (S155)

The control unit 39 then performs the current position candidate selection processing (S155). In the selection of the position candidate, the current position candidate that is to be output to the display unit 30 is selected based on the evaluation value of each of the candidates and preceding selection results. The candidate selection method may be based on:

(a) a total sum of the current evaluation value and the previous evaluation value, or (b) a total sum of the previous evaluation value and a certain factor.

After calculating the above value for candidate selection, the current position candidate having the highest value is determined as the current position. The above selection method may be varied depending on the evaluation factors.

After the selection of the candidate, the position of the selected candidate is output to the display unit 30 and displayed on the map by using an icon (S160). The icon on the previous position is deleted. The process performed by the control unit 39 is then returned to S105.

(Advantageous Effects)

The navigation apparatus 20 in the above embodiment:

(a) can accurately determine the current position of the vehicle, (b) can determine the current position with fewer cycles of calculation, and (c) can reduce the required memory area, because, (1) the navigation apparatus 20 calculates the center locus of the travelable area, and evaluates the current position candidates found on the road links based on the distance between the estimated position of the vehicle and the center locus (S140), instead of directly evaluating the road links used in the conventional method (in view of the fact that the center locus of the travelable area is closer to the actual vehicle position in comparison to the road links), and (2) the navigation apparatus 20 stores road links (line segments) for modeling the center locus in the memory, instead of storing the polygon and its apex coordinates for modeling the road. In other words, the smaller number of calculation is required for the position calculation, with smaller volume of memories (i.e., fewer hardware resources).

In addition, the navigation apparatus 20 in the above embodiment starts with the current position candidate (or the road link which has the current position candidate) to calculate and extend the road links to define the link series (i.e., the travelable path) in the travel path calculation processing (S125), to an extent of a predetermined distance, a predetermined number of links. Therefore, unnecessarily long link series is not defined.

Further, in the estimated navigation processing (S110), the relative travel distance and the relative directional change are calculated based on the signals from the gyroscope 23 and the distance sensor 24, relative to the previous cycle of processing. Then, the center locus of the travelable area is periodically updated based on the closeness to the travel locus of the vehicle. After travel locus update, the pattern matching reference point is set on the center locus for sequential update of the travel locus to calculate the estimated position of the vehicle (S135).

Therefore, in comparison to the matching scheme that matches the travel locus to the center locus time after time, fewer calculation cycles are required in the present embodiment, and the estimated position of the vehicle is more efficiently determined.

Furthermore, the navigation apparatus 20 in the above embodiment determines the road point as a point on the center locus that is closest to the estimated position, and then uses the road point to find a corresponding point on the road link, for the purpose of determining the current position candidate after the update in the current position candidate update processing (S140). Therefore, in comparison to the method that does not use the road point determined in the above-described manner, the current position candidate can be more appropriately updated.

Furthermore, the navigation apparatus 20 in the above embodiment can evaluate each of the current position candidates based on the distance between the estimated position of the vehicle and the travelable area in the current position candidate evaluation processing (S145), thereby enabling more appropriate evaluation of the current position candidates.

Furthermore, in the current position candidate deletion processing (S150), the navigation apparatus 20 in the above embodiment deletes a current position candidate after selecting a relatively lower evaluation candidate, thereby suppressing the number of the current position candidate to an appropriate level and less demanding in terms of hardware resources.

(Correspondence with Claims)

Correspondence of the terms in the above embodiment to claim language is defined in the following. The absolute position detection processing (S105) corresponds to a function of a position information acquisition unit, and the estimated navigation processing (S110) corresponds to a function of a relative travel information acquisition unit and a locus calculation unit, and the map data input unit 29 corresponds to a road data acquisition unit. In addition, the current position candidate setting processing (S120) corresponds to a function of the a candidate finding unit, and the travel path calculation processing (S125) corresponds to a function of a link series finding unit, and the center locus calculation processing (S130) corresponds to a function of a locus finding unit. Further, the current position candidate update processing (S140) corresponds to a function of a position candidate update unit, and the estimate position calculation processing (S135) corresponds to a function of a travel position estimation unit. Furthermore, the current position candidate evaluation processing (S145) corresponds to a function of an evaluation unit, and the current position candidate selection processing (S155) corresponds to a function of the current position finding unit, and the current position candidate deletion processing (S150) corresponds to a function of a current position candidate elimination unit.

(Other Embodiments)

Although the present disclosure has been fully described in connection with preferred embodiment thereof with reference to the accompanying drawings, it is to be noted that various changes and modifications will become apparent to those skilled in the art.

In the above embodiment, the navigation apparatus 20 prepares one or more of the current position candidates to select and display the most highly evaluated candidate as the current position on the map. However, the road links may be evaluated, without preparing the candidates, based on the distance from the absolute position detected in S105 (the absolute position detection processing) to the center locus of the corresponding link. The evaluation process of the above modification corresponds to a function of a travel position estimation unit, an evaluation unit, and a current position finding unit.

The above modification of the embodiment can also yield, in comparison to the conventional navigation method that evaluates the current position directly from the road links, the more accurate current position of the vehicle, due to the fact that the center locus is closer to the actual vehicle position in comparison to the road links. Further, due to the novel and advantageous method of only using the line segments in the position calculation, the smaller memory area is required in the navigation apparatus 20 in comparison to the conventional method of using the polygon and apex coordinates for the position calculation. That is, in other words, the fewer hardware resources are required. Further, the position calculation itself is made simpler and quicker.

Further, by using the travel locus calculated in the estimated navigation processing (S110), and by position-matching the travel locus to the center locus of the travelable area that corresponds to the nearby link, the current position of the vehicle may be set on the link corresponding to the most matching center locus. The above processing corresponds to a function of a travel position estimation unit. The above processing yields the same advantageous results and the same advantageous effects as the above embodiment.

Such changes, modifications, and summarized scheme are to be understood as being within the scope of the present disclosure as defined by appended claims.

What is claimed is:

1. A position finding apparatus comprising:
a position information acquisition unit for acquiring absolute position information indicative of an absolute position of a subject vehicle;
a relative travel information acquisition unit for acquiring travel information on relative travel of the subject vehicle,
a road data acquisition unit for acquiring information on road links and road width;
a candidate finding unit for finding, based on the absolute position information derived from the position information acquisition unit, one or more position candidates of a current vehicle position on a road link after extracting at least one road link that is possibly traveled by a subject vehicle from among multiple road links acquired by the road data acquisition unit;
a link series finding unit for finding, in association with respective position candidates derived from the candidate finding unit, a series of road links extending from a candidate road link that has the position candidate based on the information on the road links derived from the road data acquisition unit;
a locus finding unit for finding a center locus of travelable area in the series of road links that is indicative of a center of the travelable area based on calculation of the travelable area for the subject vehicle by utilizing the information on road width derived from the road data acquisition unit after the series of road links is found by the link series finding unit;
a position candidate update unit for updating the position candidate of the current vehicle position based on the travel information on the relative travel of the subject vehicle;
a travel position estimation unit for estimating a travel position of the subject vehicle based on the absolute position derived from the position information acquisition unit;
an evaluation unit for performing evaluation of the position candidate on the series of road links based on a distance between the estimated travel position derived from the travel position estimation unit and the center locus derived from the locus finding unit;
a current position finding unit for finding the current vehicle position of the subject vehicle on the candidate road link after selecting one of the position candidates according to an evaluation result of each of the position candidates by the evaluation unit; and
a locus calculation unit for calculating a travel locus of the subject vehicle based on the travel information derived from the travel information acquisition unit, wherein
the travel position estimation unit selects, at a predetermined timing, a most matching center locus relative to the travel locus derived from the locus calculation unit from among multiple center loci derived from the locus finding unit, and
the travel position estimation unit sets a matching point on the selected most matching center locus and finds, as the estimated travel position, a position resulting from defining the matching point as a start point of the travel locus that is derived from the locus calculation unit, instead of finding the estimated travel position of the subject vehicle based on the absolute position information derived from the position information acquisition unit.

2. The position finding apparatus of claim 1, wherein the link series finding unit finds the series of road links by arranging road links from the candidate road link toward one of a predetermined number of links and a predetermined distance.

3. The position finding apparatus of claim 1, wherein the link series finding unit finds the series of road links in a manner that prioritizes a straightforward road link that extends in a straight travel direction from the candidate road link.

4. The position finding apparatus of claim 1 further comprising:
a guidance route information acquisition unit for acquiring information on guidance route, wherein
the link series finding unit finds the series of road links that extends along a guidance route that is determined by the information derived from the guidance information acquisition unit.

5. The position finding apparatus of claim 1, wherein
the position candidate update unit defines, as a road surface point, a closest point on the center locus relative to the estimated travel position, and
the position candidate update unit uses a position on the road link that corresponds to the road surface point as the updated position candidate of the current vehicle position.

6. The position finding apparatus of claim 1, wherein
the evaluation unit performs the evaluation based on a distance between the estimated travel position derived from the travel position estimation unit and each of the travelable areas derived from the locus finding unit.

7. The position finding apparatus of claim 1 further comprising:
a candidate elimination unit for eliminating the position candidate after selecting the position candidate according to an evaluation result once the evaluation of each of the position candidates is performed by the evaluation unit.

8. A non-transitory computer-readable storage medium comprising instructions for execution by a computer serving as a position finding apparatus, the instructions for implementing:
acquiring, in a position information acquisition unit, absolute position information indicative of an absolute position of a subject vehicle;
acquiring, in a relative travel information acquisition unit, travel information on relative travel of the subject vehicle,
acquiring, in a road data acquisition unit, information on road links and road width;
finding, in a candidate finding unit, based on the absolute position information derived from the position information acquisition unit, one or more position candidates of a current vehicle position on a road link after extracting at least one road link that is possibly traveled by a subject vehicle from among multiple road links acquired by the road data acquisition unit;
finding, in a link series finding unit, in association with respective position candidates derived from the candidate finding unit, a series of road links extending from a candidate road link that has the position candidate based on the information on the road links derived from the road data acquisition unit;
finding, in a locus finding unit, a center locus of travelable area in the series of road links that is indicative of a center of the travelable area based on calculation of the travelable area for the subject vehicle by utilizing the information on road width derived from the road data acquisition unit after the series of road links is found by the link series finding unit;
updating, in a position candidate update unit, the position candidate of the current vehicle position based on the travel information on the relative travel of the subject vehicle;

estimating, in a travel position estimation unit, a travel position of the subject vehicle based on the absolute position derived from the position information acquisition unit;
performing, in an evaluation unit, an evaluation of the position candidate on the series of road links based on a distance between the estimated travel position derived from the travel position estimation unit and the center locus derived from the locus finding unit;
finding, in a current position finding unit, the current vehicle position of the subject vehicle on the candidate road link after selecting one of the position candidates according to an evaluation result of each of the position candidates by the evaluation unit; and
calculating, in a locus calculation unit, a travel locus of the subject vehicle based on the travel information derived from the travel information acquisition unit, wherein
the travel position estimation unit selects, at a predetermined timing, a most matching center locus relative to the travel locus derived from the locus calculation unit is selected at a predetermined timing from among multiple center loci derived from the locus finding unit, and
the travel position estimation unit sets a matching point on the selected most matching center locus and finds, as the estimated travel position, a position resulting from defining the matching point as a start point of the travel locus that is derived from the locus calculation unit, instead of finding the estimated travel position of the subject vehicle based on the absolute position information derived from the position information acquisition unit.

9. A method for finding vehicle position, comprising:
acquiring, in a position information acquisition unit, absolute position information indicative of an absolute position of a subject vehicle;
acquiring, in a relative travel information acquisition unit, travel information on relative travel of the subject vehicle,
acquiring, in a road data acquisition unit, information on road links and road width;
finding, in a candidate finding unit, based on the absolute position information derived from the position information acquisition unit, one or more position candidates of a current vehicle position on a road link after extracting at least one road link that is possibly traveled by a subject vehicle from among multiple road links acquired by the road data acquisition unit;
finding, in a link series finding unit, in association with respective position candidates derived from the candidate finding unit, a series of road links extending from a candidate road link that has the position candidate based on the information on the road links derived from the road data acquisition unit;
finding, in a locus finding unit, a center locus of travelable area in the series of road links that is indicative of a center of the travelable area based on calculation of the travelable area for the subject vehicle by utilizing the information on road width derived from the road data acquisition unit after the series of road links is found by the link series finding unit;
updating, in a position candidate update unit, the position candidate of the current vehicle position based on the travel information on the relative travel of the subject vehicle;

estimating, in a travel position estimation unit, a travel position of the subject vehicle based on the absolute position derived from the position information acquisition unit;
performing, in an evaluation unit, an evaluation of the position candidate on the series of road links based on a distance between the estimated travel position derived from the travel position estimation unit and the center locus derived from the locus finding unit;
finding, in a current position finding unit, the current vehicle position of the subject vehicle on the candidate road link after selecting one of the position candidates according to an evaluation result of each of the position candidates by the evaluation unit; and
calculating, in a locus calculation unit, a travel locus of the subject vehicle based on the travel information derived from the travel information acquisition unit, wherein
the travel position estimation unit selects, at a predetermined timing, a most matching center locus relative to the travel locus derived from the locus calculation unit is selected at a predetermined timing from among multiple center loci derived from the locus finding unit, and
the travel position estimation unit sets a matching point on the selected most matching center locus and finds, as the estimated travel position, a position resulting from defining the matching point as a start point of the travel locus that is derived from the locus calculation unit, instead of finding the estimated travel position of the subject vehicle based on the absolute position information derived from the position information acquisition unit.

10. The method of claim 9, wherein
the series of road links are found, in the link series finding unit, by arranging road links from the candidate road link toward one of a predetermined number of links and a predetermined distance.

11. The method of claim 9, wherein
the series of road links are found, in the link series finding unit, in a manner that prioritizes a straightforward road link that extends in a straight travel direction from the candidate road link.

12. The method of claim 9, further comprising:
acquiring, in a guidance route information acquisition unit, information on guidance route, wherein
the series of road links are found, in the link series finding unit, that extends along a guidance route that is determined by the information derived from the guidance information acquisition unit.

13. The method of claim 9, wherein
a closest point on the center locus relative to the estimated travel position is defined, in the position candidate update unit, as a road surface point, and
a position on the road link that corresponds to the road surface point is used, in the position candidate update unit, as the updated position candidate of the current vehicle position.

14. The method of claim 9, wherein
the evaluation is performed, in the evaluation unit, based on a distance between the estimated travel position derived from the travel position estimation unit and each of the travelable areas derived from the locus finding unit.

15. The method of claim 9, further comprising:
eliminating, in a candidate elimination unit, the position candidate after selecting the position candidate according to an evaluation result once the evaluation of each of the position candidates is performed by the evaluation unit.

* * * * *